US009128739B1

(12) United States Patent
Juels et al.

(10) Patent No.: US 9,128,739 B1
(45) Date of Patent: Sep. 8, 2015

(54) DETERMINING INSTANCES TO MAINTAIN ON AT LEAST ONE CLOUD RESPONSIVE TO AN EVALUATION OF PERFORMANCE CHARACTERISTICS (71) Applicants: EMC Corporation, Hopkinton, MA (US); Wisconsin Alumni Research Foundation, Madison, WI (US)

(72) Inventors: Ari Juels, Brookline, MA (US); Kevin D. Bowers, Melrose, MA (US); Benjamin Farley, Seattle, WA (US); Venkatanathan Varadarajan, Madison, WI (US); Thomas Ristenpart, Madison, WI (US); Michael M. Swift, Madison, WI (US)

(73) Assignee: EMC Corporation, Hopkinton, MA (US)

( * ) Notice: Subject to any disclaimer, the term of this patent is extended or adjusted under 35 U.S.C. 154(b) by 347 days.

(21) Appl. No.: 13/731,663

(22) Filed: Dec. 31, 2012

(51) Int. Cl.
G06F 9/455 (2006.01)
G06F 9/48 (2006.01)
G06F 9/50 (2006.01)

(52) U.S. Cl.
CPC .......... *G06F 9/45533* (2013.01); *G06F 9/4856* (2013.01); *G06F 9/5077* (2013.01)

(58) Field of Classification Search
None
See application file for complete search history.

(56) References Cited

U.S. PATENT DOCUMENTS

| 8,000,932 | B2 * | 8/2011 | Ding et al. | 702/182 |
|---|---|---|---|---|
| 8,095,929 | B1 * | 1/2012 | Ji et al. | 718/1 |
| 8,370,490 | B2 * | 2/2013 | Deng et al. | 709/225 |
| 8,601,483 | B2 * | 12/2013 | He et al. | 718/104 |
| 8,612,971 | B1 * | 12/2013 | Fitzgerald et al. | 718/1 |
| 8,799,431 | B2 * | 8/2014 | Pabari | 709/223 |
| 2010/0287549 | A1 * | 11/2010 | Neft | 718/1 |
| 2011/0185064 | A1 * | 7/2011 | Head et al. | 709/226 |
| 2011/0225277 | A1 * | 9/2011 | Freimuth et al. | 709/223 |
| 2012/0079480 | A1 | 3/2012 | Liu | |
| 2013/0007753 | A1 * | 1/2013 | Jain | 718/103 |
| 2013/0332610 | A1 * | 12/2013 | Beveridge | 709/226 |

(Continued)

FOREIGN PATENT DOCUMENTS

CN 101364899 A 2/2009
CN 102104631 A 6/2011

(Continued)

OTHER PUBLICATIONS

Amazon Web Services, "Amazon Elastic Compute Cloud (Amazon EC2)," http://aws.amazon.com/ec2/, 2012, 16 pages.

(Continued)

*Primary Examiner* — Meng-Ai An
*Assistant Examiner* — James J Lee
(74) *Attorney, Agent, or Firm* — Ryan, Mason & Lewis, LLP (57) ABSTRACT A method includes the step of running a set of instances on at least one cloud for a first time interval, each of the instances comprising a bundle of virtualized resources. The method also includes the step of evaluating one or more performance characteristics of each of the instances in the set of instances over the first time interval. The method further includes the step of determining a first subset of the set of instances to maintain for a second time interval and a second subset of the set of instances to terminate for the second time interval responsive to the evaluating step. The steps are performed by at least one processing device comprising a processor coupled to a memory.

23 Claims, 3 Drawing Sheets

(56) References Cited

U.S. PATENT DOCUMENTS

| | | | | |
|---|---|---|---|---|
| 2014/0165063 A1* | 6/2014 | Shiva et al. | | 718/1 |
| 2014/0173593 A1* | 6/2014 | Padala et al. | | 718/1 |

FOREIGN PATENT DOCUMENTS

| | | |
|---|---|---|
| CN | 102143025 A | 8/2011 |
| WO | 2012053243 A1 | 4/2012 |

OTHER PUBLICATIONS

Amazon Web Services, "Amazon EC2 Instance Types," http://aws.amazon.com/ec2/instance-types/, 2012, 6 pages.

Amazon Web Services, "Amazon Elastic Block Store (EBS)," http://aws.amazon.com/ebs/, 2012, 4 pages.

Apache Software Foundation, "ab—Apache HTTP Server Benchmarking Tool," Apache HTTP Server Version 2.0, http://httpd.apache.org/docs/2.0/programs/ab.html, 2011, 3 pages.

Apache Software Foundation, "Apache HTTP Server Project," http://httpd.apache.org/, 2012, 2 pages.

M. Asawa et al., "Multi-Armed Bandits with Switching Penalties," IEEE Transactions on Automatic Control, Mar. 1996, pp. 328-348, vol. 41, No. 3.

S.K. Barker et al., "Empirical Evaluation of Latency-Sensitive Application Performance in the Cloud," First Annual ACM SIGMM Conference on Multimedia Systems (MMSys), Feb. 2010, pp. 35-46.

Russker Coker, "Bonnie++ Benchmark Version 1.03e," http://www.coker.com.au/bonnie++/, 2008, 2 pages.

J. Dejun et al., "EC2 Performance Analysis for Resource Provisioning of Service-Oriented Applications," 7th International Joint Conference on Service-Oriented Computing (ICSOC), ServiceWave, Nov. 2009, pp. 197-207, Stockholm, Sweden.

J. Dejun et al., "Resource Provisioning of Web Applications in Heterogeneous Clouds," 2nd USENIX Conference on Web Application Development, Jun. 2011, 12 pages.

D. Gupta et al., "Enforcing Performance Isolation Across Virtual Machines in Xen," ACM/IFIP/USENIX 7th International Middleware Conference, Nov.-Dec. 2006, pp. 342-362, Melbourne, Australia.

John L. Henning, "SPEC CPU2006 Benchmark Descriptions," SIGARCH Computer Architecture News, 2006, 17 pages.

A. Iosup et al., "On the Performance Variability of Production Cloud Services," 11th IEEE/ACM International Symposium on Cluster, Cloud and Grid Computing (CCGrid), May 2011, pp. 104-113.

A. Jaleel et al., "CRUISE: Cache Replacement and Utility-Aware Scheduling," 17th International Conference on Architectural Support for Programming Languages and Operating Systems (ASPLOS), Mar. 2012, 11 pages, London, United Kingdom.

V. Kale et al., "HadoopJitter: The Ghost in the Cloud and How to Tame It," http://hdl.handle.net/2142/17084, Jun. 2010, 10 pages.

Y. El-Khamra et al., "Exploring the Performance Fluctuations of HPC Workloads on Clouds," IEEE Second International Conference on Cloud Computing Technology and Science (CloudCom), Nov.-Dec. 2010, pp. 383-387.

D. Klein et al., "Named Entity Recognition with Character-Level Models," Seventh Conference on Natural Language Learning (CONLL) at HLT-NAACL, 2003, pp. 180-183, vol. 4.

A. Li et al., "CloudCmp: Comparing Public Cloud Providers," 10th ACM SIGCOMM Conference on Internet Measurement (IMC), Nov. 2010, 14 pages, Melbourne, Australia.

S.-H. Lim et al., "Migration, Assignment, and Scheduling of Jobs in Virtualized Environment," USENIX Workshop on Hot Topics in Cloud Computing (HotCloud), Jun. 2011, 5 pages.

Dave Mangot, "EC2 Variability: The Numbers Revealed," http://tech.mangot.com/roller/dave/entry/ec2_variability_the_numbers_revealed, May 2009, 5 pages.

Microsoft Corporation, "Pricing Materials," http://www.windowsazure.com/en-us/pricing/details/, 2012, 13 pages.

Z. Ou et al., "Exploiting Hardware Heterogeneity Within the Same Instance Type of Amazon EC2," 4th USENIX Conference on Hot Topics in Cloud Computing (HotCloud), 2012, 5 pages.

R.S. Sutton et al., "Reinforcement Learning: An Introduction," Feb. 1998, 398 pages, MIT Press.

Rackspace Inc., "How We Price Cloud Servers," http://www.rackspace.com/cloud/cloud_hosting_products/servers/pricing/, 2012, 3 pages.

M.S. Rehman et al., "Initial Findings for Provisioning Variation in Cloud Computing," IEEE Second International Conference on Cloud Computing Technology and Science (CloudCom), Nov.-Dec. 2010, pp. 473-479.

T. Ristenpart et al., "Hey, You, Get Off of My Cloud: Exploring Information Leakage in Third-Party Compute Clouds," 16th ACM Conference on Computer and Communications Security (CCS), Nov. 2009, pp. 199-212.

J.C. Saez et al., "A Comprehensive Scheduler for Asymmetric Multicore Systems," 5th European Conference on Computer Systems (EuroSys), Apr. 2010, pp. 139-152, Paris, France.

J. Schad et al., "Runtime Measurements in the Cloud: Observing, Analyzing, and Reducing Variance," Proceedings of the Very Large Databases (VLDB) Endowment, Sep. 2010, pp. 460-471, vol. 3, No. 1.

M. Schwarzkopf et al., "The Seven Deadly Sins of Cloud Computing Research," 4th USENIX Conference on Hot Topics in Cloud Computing (HotCloud), Jun. 2012, 5 pages.

Burr Settles, "Biomedical Named Entity Recognition Using Conditional Random Fields and Rich Feature Sets," International Joint Workshop on Natural Language Processing in Biomedicine and its Applications (JNLPBA), Aug. 2004, pp. 104-107.

A. Shieh et al., "Seawall: Performance Isolation for Cloud Datacenter Networks," 2nd USENIX Conference on Hot Topics in Cloud Computing (HotCloud), Jun. 2010, 7 pages.

The Stanford Natural Language Processing Group, "Stanford Named Entity Recognizer (NER)," Version 1.2.4, http://nlp.stanford.edu/software/CRF-NER.shtml, Apr. 2012, 3 pages.

A. Tirumala et al., "The TCP/UDP Bandwidth Measurement Tool," Version 2.0.5, http://sourceforge.net/projects/iperf/, 2010, 3 pages.

G. Wang et al., "The Impact of Virtualization on Network Performance of Amazon EC2 Data Center," IEEE 29th Conference on Information Communications (INFOCOM), Mar. 2010, pp. 1163-1171.

P. Whittle, "Sequential Scheduling and the Multi-Armed Bandit," Optimization Over Time-Dynamic Programming and Stechastic Control, Chapter 14, 1982, pp. 210-224, vol. 1.

Wikipedia, "Markov Decision Process," http://en.wikipedia.org/wiki/Markov_decision_process, Sep. 2012, 9 pages.

J. Xie et al., "Improving MapReduce Performance Through Data Placement in Heterogeneous Hadoop Clusters," IEEE International Symposium on Parallel & Distributed Processing, Workshops and Phd Forum (IPDPSW), Apr. 2010, 9 pages.

J.-M. Xu et al., "Learning from Bullying Traces in Social Media," Conference of the North American Chapter of the Association for Computational Linguistics: Human Language Technologies (NAACL HLT), Jun. 2012, pp. 656-666, Montreal, Canada.

S. Yeo et al., "Using Mathematical Modeling in Provisioning a Heterogeneous Cloud Computing Environment," IEEE Computer Society, Aug. 2011, pp. 55-62, vol. 44, No. 8.

M. Zaharia et al., "Improving MapReduce Performance in Heterogeneous Environments," 8th USENIX Symposium on Operating Systems Design and Implementation (OSDI), Dec. 2008, pp. 29-42.

C. Zhang et al., "Big Data Versus the Crowd: Looking for Relationships in All the Right Places," 50th Annual Meeting of the Association for Computational Linguistics, Jul. 2012, pp. 825-834, vol. 1, Jeju Island, Korea.

U.S. Appl. No. 13/532,132, filed in the name of S. Faibish et al. Jun. 25, 2012 and entitled "Method and Apparatus for Selection Between Multiple Candidate Clouds for Job Processing."

* cited by examiner

DETERMINING INSTANCES TO MAINTAIN ON AT LEAST ONE CLOUD RESPONSIVE TO AN EVALUATION OF PERFORMANCE CHARACTERISTICS

STATEMENT OF GOVERNMENT RIGHTS

This invention was made with government support under 1065134 awarded by the National Science Foundation. The government has certain rights in the invention.

FIELD

The field relates generally to information processing systems, and more particularly to cloud-based information processing systems.

BACKGROUND

Public clouds are increasingly being utilized to meet the information technology needs of individuals, business enterprises and other users. Such public clouds may be shared by a very large number of users, and therefore performance can be highly unpredictable. For example, performance of a given public cloud may vary significantly from user to user and also from processing job to processing job for a given user, based on a variety of factors that are usually not readily apparent to the users. Moreover, users often have multiple options in terms of the particular public clouds to utilize for different processing jobs, but no reliable mechanism is available to assess the relative advantages of these public clouds as applied to a particular processing job.

Even though data may be available within a cloud-based information processing system that could assist users in assessing public cloud performance, such data is often in large part kept confidential by the corresponding cloud service provider, and therefore is typically limited to use by internal information technology administrators and other personnel of the cloud service provider.

By way of example, a virtual machine (VM) run on a particular public cloud may have significantly different performance characteristics than a different VM run on the same public cloud or on another public cloud, even when the cost of running both VMs is the same. Distinct underlying hardware differences, contention and other phenomena can result in vastly differing performance across supposedly equivalent instances of the VM. As a result, there is striking variability in the resources received for the same price.

A need therefore exists for improved techniques for user interaction with public clouds and other cloud-based processing systems.

SUMMARY

Illustrative embodiments of the present invention provide techniques for exploiting performance heterogeneity in clouds.

In one embodiment, a method includes the step of running a set of instances on at least one cloud for a first time interval, each of the instances comprising a bundle of virtualized resources. The method also includes the step of evaluating one or more performance characteristics of each of the instances in the set of instances over the first time interval. The method further includes the step of determining a first subset of the set of instances to maintain for a second time interval and a second subset of the set of instances to terminate for the second time interval responsive to the evaluating step. The steps are performed by at least one processing device comprising a processor coupled to a memory.

Advantageously, one or more of the illustrative embodiments disclosed herein provide simple and efficient techniques for improving performance and cost for cloud computing tasks.

These and other features and advantages of embodiments of the present invention will become more readily apparent from the accompanying drawings and the following detailed description.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
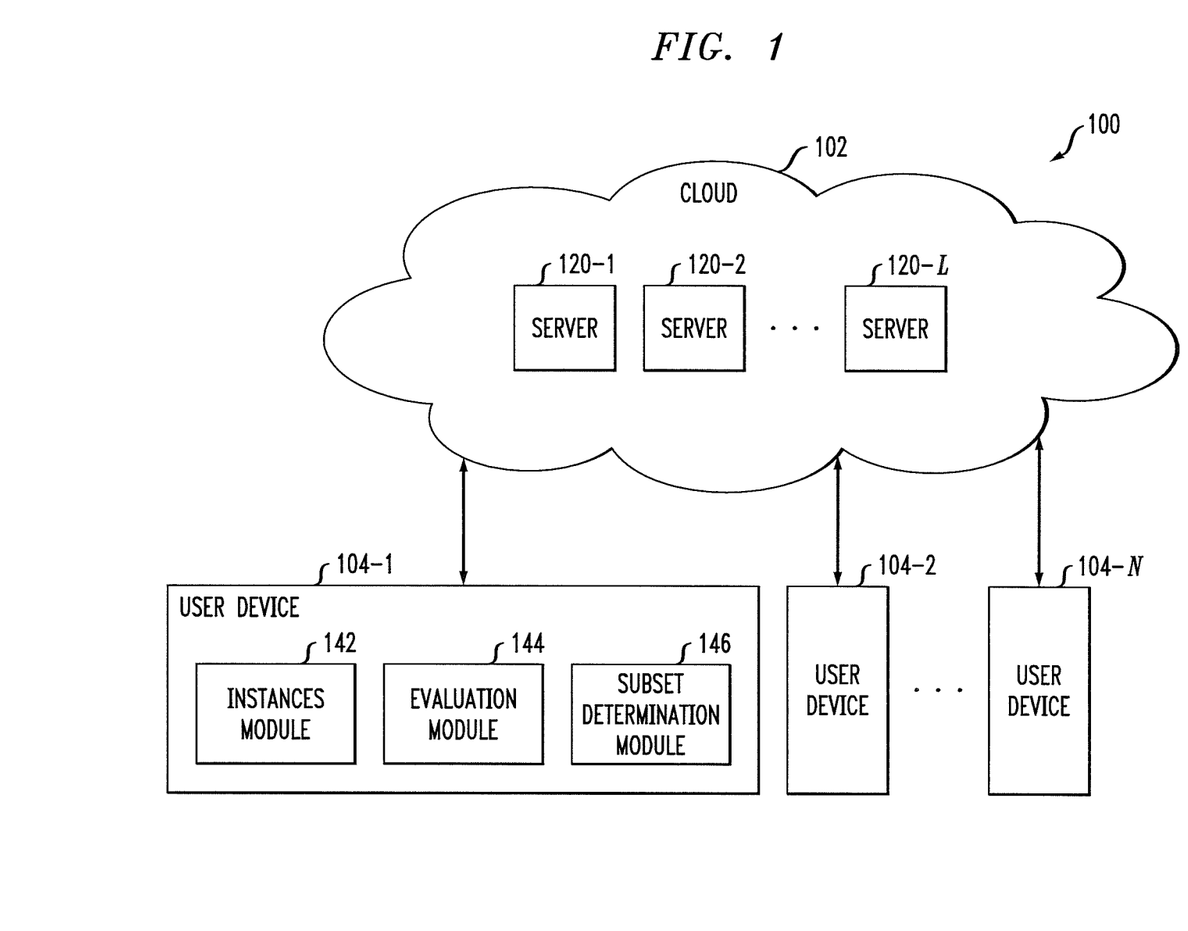
FIG. 1 illustrates an information processing system, according to an embodiment of the invention.

FIG. 1 shows an information processing system 100 configured in accordance with an illustrative embodiment of the present invention. The information processing system 100 comprises a cloud 102 and a number of user devices 104-1, 104-2, . . . , 104-N. A user associated with one or more of the user devices 104 may be an individual, a business enterprise, an IT administrator or other type of user. The term "user" as utilized herein is therefore intended to be broadly construed so as to encompass a human user as well as an inanimate system entity. Also, the term may refer to a human user, an associated device or set of devices, or a combination of both a human user and an associated device or set of devices. The same reference numeral 104 may be used for all of these cases, with the particular user arrangement being understood from the context.

The user devices 104 may be mobile telephones, laptops, desktop computers, tablet computers, or other processing devices suitable for interacting with cloud infrastructure over one or more networks.

The user or users associated with user devices 104 may be considered tenants or customers of the cloud 102 of the cloud infrastructure of system 100. The cloud 102 comprises a number of servers 120-1, 120-2, . . . , 120-L. The number of servers within cloud 102 is purely arbitrary, and may be varied as desired in embodiments of the invention. The cloud 102 may be a public cloud or a private cloud associated with the user or users. In addition, although FIG. 1 illustrates only a single cloud 102, embodiments are not limited solely to arrangements where user devices interact with a single cloud. Instead, one or more of the user devices 104 may interact with two or more clouds, including combinations of private and public clouds and clouds provided by two or more different providers.

Moreover, the system 100 can of course be configured to support a large number of user devices. Also, multiple users may be permitted to access current status information and other data associated with a given processing job that is executing in the cloud 102 of the cloud infrastructure. For example, each processing job that is executing may be provided with a unique job identifier, and users that enter the job identifier and an appropriate password may obtain access to the associated job data. Other types of authentication mechanisms may be implemented in system 100 in order to ensure the security of the processing jobs as those jobs are executed in the cloud infrastructure.

The cloud infrastructure of system 100 may be viewed as comprising physical infrastructure and associated virtualization infrastructure running on the physical infrastructure, and such infrastructure or portions thereof may be implemented using one or more processing devices of a processing platform. Examples of processing platforms that may form at least portions of the cloud infrastructure in system 100 will be described in more detail below in conjunction with FIGS. 3 and 4.

As noted above, the system 100 in the present embodiment implements various processes that provide enhanced user control over processing jobs that are executed in the cloud 102. An example of such a process will be described below, but it is to be appreciated that numerous other types of processes may be used in other embodiments.

A given cloud infrastructure processing device or user processing device generally comprises at least one processor and an associated memory, and includes one or more functional modules for controlling certain features of the system 100. For example, user device 104-1 as shown in FIG. 1 comprises an instances module 142, an evaluation module 144 and a subset determination module 146, which will be described in further detail below.

For example, the user devices 104 in the present embodiment may comprise a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. This memory and other memories disclosed herein may be viewed as examples of what are more generally referred to as "computer program products" storing executable computer program code.

The user devices 104 may also include network interface circuitry that is configured to allow the user device to communicate over one or more networks with the cloud infrastructure of system 100, and possibly with other user devices, and may comprise one or more conventional transceivers. The one or more networks may include, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks.

Similar processor, memory and network interface elements may be utilized in processing devices that provide cloud 102 and servers 120 of the cloud infrastructure.

It is to be appreciated that the particular set of elements shown in FIG. 1 for providing enhanced user involvement in processing job execution in one or more public clouds is presented by way of illustrative example, and in other embodiments additional or alternative elements may be used. Thus, another embodiment may include additional or alternative arrangements of user devices, clouds, servers, etc.

As mentioned previously, various elements of system 100 such as computers, servers, storage devices or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Embodiments of the invention implement what is referred to herein as placement gaming, or strategies by which customers can exploit performance heterogeneity to lower their costs for completing a processing job or task on a cloud. The term "processing job" as used herein is intended to encompass any type of functionality that may be performed in cloud infrastructure for a particular user, and will generally involve the execution of at least one application, which may include, for example, an application that involves processing, storing and transmitting user data.

It is to be understood that the term "application" as used herein is intended to be broadly construed. Accordingly, references herein to multiple applications should be understood to encompass, for example, a set of entirely different applications, or a set of different instances of a given application, as well as various combinations of different applications and application instances. An application instance is therefore considered a type of application as that latter term is broadly applied herein.

As used herein, the term "instance" is used to refer to a bundle of virtualized resources. An instance may be a VM, as will be discussed in further detail below with respect to FIG. 3.

Cloud computing providers typically use a simple billing model in which customers pay a flat hourly fee for a bundle of virtualized resources. For example, Amazon's Elastic Compute Cloud (EC2) provides a variety of instance types that each offer a level of CPU power measured by abstract units (EC2 Compute Units, or ECUs) together with storage, memory, and either "low," "moderate" or "high" input/output (I/O) performance. Rackspace, Microsoft Azure, and other providers are similar.

However, not all instances of a given type are created equal. Data centers grow to contain multiple generations of hardware (e.g., network switches, disks, and CPU architectures) as old components are replaced or new capacity is added. Network topology may vary, with some routes having lower latency or supporting higher bandwidth than others. Multiplexing systems across customers with different workloads can also lead to uneven resource contention across the cloud. While a provider can try to render performance uniform across all users of the same abstract instance type, in practice this is untenable due the costs of maintaining homogeneous infrastructure and enforcing rigid isolation policies. Thus, a customer that runs the same application on two instances, of the same abstract type, will often end up paying the same amount for measurably different performance. The result of successful placement gaming is improved efficiency, such as lowered cost for the same amount of computation, or increased performance for the same cost.

Embodiments of the invention may be implemented on clouds which provide only coarse-grained control over placement, i.e., one can start new instances or shutdown existing ones but cannot exert direct control over what physical machines these instances are assigned to. Embodiments of the invention, however, may also be implemented on clouds which provide more fine-tuned control over placement of instances. Embodiments of placement gaming may use one or both of up-front exploration and opportunistic replacement. In up-front exploration, a customer initially launches more instances than needed and retains only ones predicted to be high-performers. In opportunistic replacement a customer can choose to migrate an instance (by shutting it down and launching a fresh copy) based on projections of future performance for the instance.

An estimation of an instance's future performance may be obtained using a variety of techniques. One strategy looks at historical performance of the customer's job, which is particularly suited to cases where temporal variability on instances is relatively low. This strategy is black box, meaning that it requires no understanding of the cloud infrastructure. Other strategies which may be used are considered gray box, meaning that they leverage partial knowledge of the provider's infrastructure, such as known distributions of processor types, network topology, or scheduling mechanisms. Gray box strategies may be adjusted for use with a particular cloud provider based on information which the cloud provider makes available regarding the cloud infrastructure and hardware.

Cloud computing environments can exhibit substantial performance heterogeneity. Variations in CPU, memory, network, disk and application performance contribute to this heterogeneity. There are generally three types of heterogeneity in cloud computing environments: inter-architecture, or differences due to processor architecture or system configuration; intra-architecture, or differences within a processor architecture or system configuration; and temporal, or differences within a single VM or other instance, machine, server or cloud over time.

A major source of heterogeneity in cloud environments is physically different processor architectures. This can occur either when a mix of machines is purchased initially or when a data center adds machines of a different type. Differences between processors directly affect performance, as newer generations typically incorporate more advanced pipelines and memory systems. Furthermore, cloud providers may not penalize virtual machines using newer processors with reduced CPU time. Thus, many applications may benefit substantially if they can run on the best architecture for their needs.

There is also substantial variation across systems with the same architecture. This can arise from different system-level components, such as memory and peripherals, and from long-term interference from other workloads on the same node. For CPU-sensitive applications the variation within a processor type tends to be smaller than that between different processor types, while for disk and network the opposite is true.

The performance of a single instance can vary over time due primarily to competing workloads. Thus, the stability of a workload depends highly on the machine on which an instance is placed, as well as the resources it uses.

The variation between architectures demonstrates that cloud customers may want to select specific processor types to optimize performance. However, the performance variation within a processor type further shows that this may be insufficient for I/O performance, as there is similarly high variation within a single processor type. Furthermore, the variation of individual nodes over time indicates that workloads may prefer nodes with more stable performance and benefit from migrating away from congestion.

Embodiments of the invention allow customers to guide the placement of their tasks or processing jobs onto VMs or other instances with good performance, thus lowering the cost of a task, reducing its completion time, or otherwise improving efficiency. A customer or tenant may use placement gaming in embodiments of the invention to schedule a job J on a public cloud. Embodiments of the invention can be used in instances where the customer is only able to use a cloud provider's legitimate application programming interface (API) in a manner that optimizes performance relative to cost. Cloud providers, rather than customers, typically control assignment of VMs or other instances to physical machines Thus, a typical provider API may allow a customer only to start and stop instances of various types on a cloud. A customer, however, may be able to select a particular portion, such as an availability zone or geographic region, of the cloud on which to start an instance.

In embodiments of the invention, a customer may also use a gray box strategy of selecting a particular portion of the cloud which is known to have a larger fraction of newer CPU architectures, better network bandwidth, better disk performance, etc. Such a strategy, however, is not always sufficient due to the fact that certain tasks or processing jobs may not benefit from faster CPUs or increased network bandwidth and disk performance. In addition, customers may prefer to use multiple availability zones to improve reliability, or the number of available instances in a given zone may be limited. Similarly, a customer may achieve different efficiencies from different instances types, such as small (shared core) or large (dedicated multiple cores) instances. As with the choice of availability zone, placement gaming in embodiments of the invention permits a customer to choose a particular instance type to improve performance.

Placement gaming in embodiments of the invention can exploit several features of cloud computing common to most cloud providers. First, cloud providers often bill for usage on fine time scales, such as by the hour. Thus, it is possible to use a machine for an hour and give it up if it is too slow. Second, cloud providers allow programmatic control over launching virtual machines. This allows control software to dynamically launch additional instances in the hope of improving performance. Third, cloud workloads are often cost-associative and can use varying numbers of machines; this allows the productive use of extra machines for short periods. Finally, many cloud workloads store their persistent state in networked storage. Thus, moving a workload from one machine to another need not entail migration of the entire data set. In addition, applications run in distributed systems like EC2 are often intentionally optimized to be able to shut down and restart quickly.

A model for placement of instances is described below, which assumes that customers launch servers synchronously, and that servers are scheduled with a minimum granularity referred to as a quantum such as one hour. Various other quanta may be used, such as the minimum billing unit for a particular instance. Integral quanta denoted by $t=1, 2, \ldots$ may be used to organize job time. The provider draws servers from some pool, having variation across servers in the amount of job-specific work they perform within a time quantum (cross-instance heterogeneity). There is also variation across the amount of work performed by a single instance across time quanta (temporal heterogeneity). The rate of job execution of a given server S during a time quantum t is denoted as $r_t(S) \in [0, \infty]$. A server's rate is job-specific, as different jobs leverage different blends of resources.

For simplicity, the performance of each server is dictated according to a probability distribution $\mathbb{S}$. Thus, the sequence of rates $r_1(S), r_2(S), \ldots$ is drawn independently from $\mathbb{S}$ for each server S.

A placement schedule P is a sequence of sets of servers denoting job placement across time. Let P[t] be the set of servers assigned to a job in time quantum t. For a placement schedule P of duration T, the cost is $$c(P) = \sum_{t=1}^{T} |P[t]|,$$

i.e., the total number of server-quanta units it consumes. The overhead associated with launching an instance is modeled by a time penalty m, which is the fraction of the first quantum consumed by overhead. A quantum at which a job was launched on S is denoted $first(S) \in \{1, \ldots, T\}$. The achieved rate of S is thus $$\tilde{r}_t(S) = \begin{cases} r_t(S) \cdot (1-m) & \text{if } t = \text{first}(S) \\ r_t(S) & \text{otherwise} \end{cases}.$$

The work yielded by a placement schedule P is thus $$w(P) = \sum_{t=1}^{T} \sum_{S \in P[t]} \tilde{r}_t(S).$$

The work output by a placement schedule in quantum t is denoted $w(P[t]) = \Sigma_{S \in P[t]} \tilde{r}_t(S)$; The cost is denoted $c(P[t]) = |P[t]|$. The support of a placement schedule P is defined as $supp(P) = \min_{t=1}^{T} |P[t]|$. This is the minimum number of servers executing J in any quantum.

In embodiments of the invention, a customer employs a placement strategy σ, which guides the construction of a placement schedule as a job executes. In some embodiments, customers can control placement only indirectly, by starting and stopping instances. Therefore, strategies σ at the end of any quantum t>0 determine: (1) which servers in P[t] to terminate and thus which servers in P[t] to retain, i.e., continue running in quantum t+1; and (2) how many fresh servers to request from the provider in quantum t+1.

At the end of quantum t, a placement strategy determines a set of servers $K[t+1] \subseteq P[t]$ to keep, i.e., to include in P[t+1]. Let $k[t] = |K[t]|$. At the end of quantum t, a placement strategy also determines a number f[t] of fresh servers to invoke in the next quantum, i.e., to add to P[t+1]. The resulting set of fresh servers is denoted F[t+1].

Thus, $P[t+1] = K[t+1] \cup F[t+1]$. For t=1, all servers are fresh instances, i.e., P[1]=F[1]. Before job execution, at the end of quantum t=0, the strategy σ determines the number of initial servers to start up by setting f[1]. As there are no servers to retain at the beginning of a job, K[1]=0. A strategy σ takes as input the current time t, the so-far placement schedule P[1 ... t], and the so-far observed rates. The strategy σ also outputs (K[t+1], f(t+1)).

For a given job J and distribution $\mathbb{S}$ on server performance, σ induces a probability distribution over placement schedules P, denoted $P \leftarrow \sigma(\mathbb{S})$ or, for brevity, just $P \leftarrow \sigma$. Consequently, σ induces probability distributions over placement schedule properties, such as costs c(P) and work w(P).

There are several performance objectives for a placement strategy. A customer may wish to minimize the cost or the latency of executing a job J. The tenant may alternatively or additionally wish to bound the cost of its execution of job J, but maximize the amount of achieved work. Additionally, as a placement strategy σ generates schedules P probabilistically based on the distribution $\mathbb{S}$ of available machines, "maximization" may be defined in any of a number of ways. For example, maximization may be defined in terms of expected work w(P), in terms of the probability of w(P) exceeding a certain threshold, etc.

Embodiments described below focus on the objective of maximizing the efficiency e(P) of a job J. It should be understood, however, that embodiments of the invention are not limited solely to the objective of maximizing efficiency, but instead may use various other objectives as described herein. The efficiency of job J is the work per unit cost averaged across the entire execution, $$e(P) = \frac{w(P)}{c(P)}$$

where c(P) incorporates both the time spent executing the workload as well as time for testing the performance of instances and for migrating an application between instances.

Placement strategies have a trade-off between exploration and exploitation. It may be beneficial to retain and repeatedly use a "good" server S, i.e., one with high rates. Conversely, though, launching additional servers offers the possibility of discovering new servers with higher rates than retained ones.

The problem of job placement may be viewed as a Markov decision process (MDP), in which the set of servers P[t] at time t is the system state, and specification of (K[t+1], f(t+1)) is an action. However, for complex distributions $\mathbb{S}$ of performance and a large number of servers, the state space is quite large. Solution approaches such as dynamic programming may be computationally costly, and also have the drawback of yielding complicated placement strategies and cost structures.

A restricted space of placement strategies $\Sigma_{(A,B)}$, referred to as (A, B) strategies herein, are considered in some embodiments of the invention. (A, B) strategies run at least A servers in every quantum and launch an additional B "exploratory" instances for one quantum each at some point during the execution. This model covers a wide variety of strategies that launch additional instances solely for the purpose of evaluating their performance as well as strategies that replace executing instances. For a fixed number T of quanta, an (A, B) strategy $\sigma \in \Sigma_{(A,B)}$ is one that always yields a placement schedule P in which $supp(P) \geq A$ and $\Sigma_{i=1}^{T} f[i] = A+B$. An (A, B) strategy has fixed cost c(P)=TA+B.

An example is the (A, 0) strategy $\sigma_{null}$, the null strategy, that launches A instances in the first quantum and uses them for the remainder of the schedule. This strategy is optimal should all servers offer precisely the same performance. When heterogeneous performance is the norm, though, the class of $\Sigma_{(A,B)}$ allows more refined strategies. As discussed above, one or both of up-front exploration and opportunistic replacement may be used in embodiments of the invention.

In up-front exploration, the strategy attempts to find high-performing instances early so that they can be used for longer in the execution of a job. An (A, B) strategy that uses up-front exploration launches all B "exploratory" instances at the start of a job, i.e. at time t=1. At time t=2 the highest performing A instances are retained and the other B instances are shut down.

In opportunistic replacement, the strategy attempts to seek out better performing instances or adapt to slow-downs in performance. Opportunistic replacement involves migrating an instance, or shutting it down and replacing it with a fresh one to continue its work. An (A, B) strategy that uses opportunistic replacement will retain from time t instances that are deemed high performers and migrate instances that are low performers.

Embodiments of the invention which employ placement gaming rely on accurate judgments about instance performance. Up-front exploration ranks server performance and opportunistic replacement distinguishes between low and high performance. A natural dichotomy exists between strategies that do so by exploiting partial knowledge about the infrastructure and those that do not. Gray box strategies make decisions based in part on partial knowledge of the provider's infrastructure, such as hardware architectures, network topology, provider scheduler, or historical performance of instances. Black box strategies use only the measured performance (rate) of the tenant's instances. While gray-box strategies are potentially more powerful, black-box strategies can be simpler and more portable. For example, they can work for more causes of heterogeneity and for unknown machine distributions.

One black box strategy, referred to herein as PERF-M, combines up-front exploration (when B>0) with opportunistic replacement. PERF-M uses the up-front exploration stage to estimate average performance of the job, and then in the remainder of the run the strategy attempts to beat that average. PERF-M ranks instances at the end of t=1 based on their performance during t=1. In other embodiments, strategies may rank instances based on their performance during t=1 and previous quanta or other historical performance information.

For opportunistic replacement, PERF-M migrates an instance if its recent performance drops sufficiently below the average performance of all instances that ran in the first quantum. To define "sufficiently," a heuristic threshold is used that estimates the expected cost of migration needed to achieve above-average performance, amortized across the remaining time of the run. A replacement rule that a server S will be migrated is thus $$\overline{avg}_1 - r_t(S) > \delta = \frac{2m}{T-t} \quad (1)$$

where $$\overline{avg}_1 = \sum_{i=1}^{A+B} r_1(S)/(A+B),$$

m is the time penalty of migration and T is the total duration of the computation.

In detail, PERF-M works as follows. Initially, A+B instances are launched at time t=0. This set of instances is P[1]. At the end of the first time quantum, the rate $r_1(S)$ is measured for each instance S∈P[1]. The mean performance is computed as $$\overline{avg}_1 = \sum_{i=1}^{A+B} r_1(S)/(A+B).$$

The retained set is denoted K[2]⊆P[1], which includes instances S such that both: (i) S is one of the top A performers within P[1]; and (ii) $\overline{avg}_1 - r_1(S) \le \delta$. All other instances, i.e., P[1]\K[2] are shut down, and A−|k[2]| fresh instances are launched to maintain a minimum of A instances in every period. At the end of each quantum 2≤t<T and for each instance S∈P[t], S is put in K[t+1] if $\overline{avg}_1 - r_t(S) \le \delta$. All other instances P[t]\K[t+1] are shut down and A−|k[t+1]| fresh instances are launched.

Thus, the PERF-M strategy starts more than the necessary number of instances and shuts down the slowest B of them at the end of the first period. In addition, in every period it shuts down all machines with below-average performance and replaces them. PERF-M may also use moving estimates of both the average performance and each server's performance. The moving estimates may be obtained using a variety of techniques, including using exponentially weighted moving averages.

Embodiments of the invention may use a placement strategy wherein the opportunistic replacement is $$\overline{avg}(\mathbb{S}) - \overline{r}(S) > \delta \quad (2)$$

where $\overline{avg}(\mathbb{S})$ is an estimate of the average rate across all servers, namely avg($\mathbb{S}$), and $\overline{r}(S)$ is the estimated performance of the server, namely r(S). The value δ is used to indicate a penalty associated with migrations. In particular, δ=2m/(T−t) is used as a heuristic, where m is an estimate of the time between launching a new instance and the new instance performing work. Thus, δ represents the amortized cost of migration across the expected number of migrations (for a balanced distribution) needed to achieve $\overline{r}(S) \ge \overline{avg}(\mathbb{S})$.

The estimates $\overline{avg}(S)$ and $\overline{r}(S)$ vary depending on whether the strategy is gray box or black box. In gray box strategies, decisions are based in part on partial knowledge of the provider's infrastructure, such as hardware architectures, network topology, provider scheduler, or historical performance of instances. In black box strategies, the measured performance (rate) of the tenant's instances is used. Thus, an opportunistic (A, B) strategy σ running for T quanta launches A+B servers at time t=1. At the end of every quantum t, for 1≤t<T−1 and every S∈{$S_1, \ldots, S_A$}, it places S in K[t+1] if avg($\mathbb{S}$)−r(S)>δ and then sets f[t+1]=A−k[t+1].

A simplification implicit in the model described above is that server migration carries little or no cost, i.e., that no job time is lost in setting up a fresh server. Of course, in reality, migration does carry some cost, one that is specific to the nature of the job J and also to the size of a quantum.

Migration cost doesn't impact the principle of up-front exploration. If the number of fresh servers to be launched is fixed in a given strategy σ at A+B, then the migration cost for the strategy is also fixed. The scheduling of these fresh servers doesn't impact the overall job cost, so the analysis above supporting launch at time t=1 still holds.

Migration cost, however, does impact—in particular, diminish—the benefit of opportunistic replacement. The cost of migration should be taken into account in assessing whether to terminate a retained server and launch a fresh one.

We denote m as the cost of migration for a given job J and quantum size. As the resource costs of migration differ from job execution, we characterize m simply in terms of the number of quantum hours consumed in a single migration, i.e., the termination of one server and launch of a fresh one.

The cost of migration is amortized over the running time of a freshly launched server. Of course, this running time is a random variable—itself dependent upon the placement strategy σ. As a heuristic choice, a crude estimate is employed that when a server is replaced, the number of replacements over the remainder of the job is $\mu=1/(1-(avg(\mathbb{S})))$. This is the expected number of server replacements needed to achieve $r(S) \geq avg(\mathbb{S})$. The amortized cost of migration is thus estimated at $2m/(T-t)$ and, consequently, for strategy σ, set as $\delta = \mu m/(T-t)$.

When μ is difficult to estimate, due to a complex or unknown distribution $\mathbb{S}$, a heuristic $\mu=2$ may be chosen, which represents the expected number of server replacements needed to achieve $r(S) \geq avg(\mathbb{S})$ when $D(avg(\mathbb{S}))=\frac{1}{2}$, i.e., for distributions symmetric around the mean.

An alternative or additional placement objective of particular interest is the minimization of the cost of a job J requiring a fixed amount of work W. In this case, there is no bound on T. The goal is to minimize $E\mathbb{S}[c(P)]$ under σ strategy that outputs P such that $w(P) \geq W$. A variant opportunistic (A, B) strategy $\sigma_{(A,B)T}^{\hat{O}}$ is particularly suited for this case. First, the optimal choice is A=1, i.e., J should be run exclusively on the fastest (highest-rate) discovered server. Additionally, as T isn't fixed, it must be estimated in this scenario in order to set δ. At a given time t>1, when a single server S is running, the estimation of T at time t as $T \approx W[t]/r(S)$ can be used, where W[t] is the amount of work for job J remaining at time t.

The speedup offered by a placement schedule P arising from a strategy and the placement schedule $P_{null}$ may be determined according to the following equation:

$$spd(P, P_{null}) = \frac{e(P)}{e(P_{null})} = \frac{w(P) \cdot T \cdot A}{w(P_{null}) \cdot (T \cdot A + B)}$$

where the costs of the two placement schedules, $c(P)=T \cdot A+B$ and $c(P_{null})=TA$ are inserted. Work completed is calculated using the achieved rate (which subtracts time lost due to migration) times the total number of instance hours.

Three major features of cloud environments affect the achievable speedup from placement gaming in embodiments of the invention: the magnitude of the difference in performance between machines, the performance variability observed by applications, and the distribution of differently performing machines. The size of the differences between machine performance essentially determines the cost of running on a slow machine (or conversely, the benefit of being on a fast machine). Performance variability affects the ability of a placement strategy to accurately predict future performance from a small number of measurements, while the distribution of machines affects the likelihood of improving performance by migrating to a new instance.

Up-front exploration strategies do significantly better as the separation between "good" and "bad" instances increases. When the separation is small, the two distributions overlap so much that intra-instance variation is nearly as large as inter-instance variation. An up-front strategy measuring performance during the first time quantum cannot determine which instance will perform best in the long run. Replacement strategies generally do better than the up-front strategies, and the effect of larger separation is seen most as B increases.

The impact of variability within a machine's performance does not have much impact on the upfront strategies, but does impact the gains seen by replacement strategies. The upfront strategies merely sample from the combined distribution, whose average remains constant. Widening of the distributions allows for a few slightly better instances, which are canceled out by a few slightly worse instances available and the larger number of average instances. If B is raised significantly, more of the space can be sampled and potential gains may be achieved with wider distributions. Raising B, however, involves a much longer time horizon to recoup the cost of a larger initial search.

In a replacement strategy, however, the tighter the distribution, the better the performance achieved. This is particularly visible when B=0. In this case, no extra instances are launched at the start and the strategy relies on migrations to improve performance. When the distributions are tight, all of the "bad" instances will perform significantly worse than the average, causing an attempted migration. When this migration is successful in moving that instance to the "good" distribution, the performance improvement will be significant. Two things happen as the distributions widen and overlap: some of the "bad" instances move close enough to the average to avoid migration; and successful migrations may be only a slight improvement.

The distribution of machines, or architectural mix, may also affect the gains achieved by various strategies. Up-front strategies naturally perform best when the fraction of "good" machines is high. For a low fraction of "good" machines, the performance of up-front strategies increases linearly as B increases, and increases faster the higher the fraction of "good" machines, eventually topping out once the total number of instances started (A+B) is enough to ensure that at least A of them are in the "good" distribution. As the fraction of "good" machines goes up, a smaller B is needed to achieve the same performance, which lowers total cost.

For replacement strategies, the analysis is a little more complex. If the number of "good" machines is too small, the initial instances may all land in the "bad" distribution and the existence of better machines may be missed. If the number of "good" machines is small, the difficulty migrating to a "good" machine may outweigh the benefit of getting there, especially if the length of the workload is short. Performance of the replacement strategies increases as the fraction of good machines increases until roughly one third of the machines are "good." Above that point, replacement strategies continue to outperform both the null and up-front strategies, but the percentage improvement over a null strategy starts to go down as the null strategy begins to improve.

Customer workload affects the ability to observe speedup both through the performance differences it achieves on different machines and through the scalability and lifetime of the workload. For example, workloads with low use for parallelism may benefit differently from strategies that launch many instances up front. Similarly, workloads that run for short periods may not have time for opportunistic replacement to find high-performance instances.

The available parallelism may also affect speedup. Workloads with perfect parallelism can run on any number of machines and achieve the full combined throughput of all instances. In reality, many workloads are not perfectly parallelizable, either requiring some constant "recombining" cost per parallel instance, or are simply unable to parallelize beyond a certain point. The limit of parallelization, $L_p$ affects the up-front strategies more than the replacement strategies as the total number of instances running at a time may be capped. This would limit the search space to $A+B \leq L_p$.

The running time of a task or job may also affect speedup. If tests only ran for a couple of hours, the cost of migration could overwhelm the potential benefit, reducing the number of migrations and minimizing performance speedup. Conversely, if a job were to run forever, it would make sense to spend a lot of resources to secure placement on the very best machines as even a small performance improvement over such a long time would pay off.

In one embodiment, where A=10 and T=24, up-front strategies do best when launching between 30 and 50 total instances, keeping only the top 10 after the first hour. For different A and T values, however, an optimal number of instances will naturally change. If the job is run for a longer period of time, these numbers would go up as launching more instances allows for more exploration of the space in order to find the best performing machines. Similarly, in replacement strategies, the number of migrations per hour decreases as the job runs, due to the limited time remaining to compensate for the cost of the migration. There is a constant trade-off between finding "good enough" machines and the cost associated with the search, all relative to the time available to recoup that cost.

A placement strategy referred to herein as CPU performs up-front exploration using A+B instances, retaining the A instances with the fastest CPUs and subsequently performs no migrations. A placement strategy referred to herein as CPU-M performs the same up-front exploration as CPU and performs a migration using a thresholding equation similar to Equation 2. Particularly, let cpu(S) be the rate of the architecture of S, as measured in the one-time measurement phase. Let $\overline{C}$ be the average performance across all instances. Then, a server S will be migrated if $$\overline{C} - cpu(S) > \delta$$

where $\delta$ is defined as discussed above.

Another placement strategy which may be used in embodiments of the invention is an opportunistic (A, B) strategy that seeks out the best architecture as reported by a measurement phase. A strategy referred to herein as CPU-MAX performs the same up-front exploration as CPU and then performs migration whenever an instance's processor architecture is not the best performing architecture.

A placement strategy referred to herein as PERF is a black box strategy which executes an up-front exploration. A+B instances are run for the first quantum, and after the first quantum the B worst-performing instances are shut down. Another black box strategy is PERF-M, which uses the same up-front exploration as PERF but also performs opportunistic replacement by migrating any instance whose recent performance was below the first quantum's average as described above.

Generally, as A+B increases, the CPU, CPU-MAX, PERF and PERF-M strategies converge in performance. CPU-MAX will typically be the best performing gray box strategy. The black box strategy PERF-M approaches the performance of CPU-MAX. The CPU, CPU-MAX, PERF and PERF-IM strategies all exhibit improved performance with increasing T. Opportunistic replacement strategies, except CPU-A fare better in the long run when compared to the up-front exploration strategies. Since CPU-M looks only at the average performance of each CPU type for taking migration decisions, it ends up overlooking the performance variability of each CPU.

Embodiments of the invention which implement placement gaming may also address situations in which one customer's placement gaming impacts the distribution of performance obtained by other customers. Assuming that there is a limited number of high-performing machines, placement gaming exhibits a "first-mover" advantage. A first group of customers who perform placement gaming prior to a second group of customers will obtain an advantage over the second group of customers. That is, placement gaming by the first group of customers decreases performance for the second group of customers. When the number of good machines is larger than the total number of machines requested, the second group can match the performance of the first group by way of placement gaming. When the number of good machines is not larger, the second group's performance suffers.

Cloud computing environments will inevitably demonstrate some level of performance heterogeneity due to hardware variation and competing workloads. Embodiments of the invention allow cloud customers, by means of placement gaming, to deliberately guide the placement of their workloads to improve performance by selectively switching workloads off poorly performing machines. While embodiments of the invention have been described with respect to the objective of maximizing efficiency or reducing cost for a particular job, other objectives may be used in addition to or instead of these objectives in other embodiments of the invention. By way of example only, embodiments may use the objective of improving stability for a given job or task. In addition, while embodiments have been generally described above in the context of a single customer, embodiments of the invention are not limited solely to a single customer which performs placement gaming. Instead, embodiments of the invention may involve multiple customers performing placement gaming simultaneously, either cooperatively or competitively.

Figure 2:
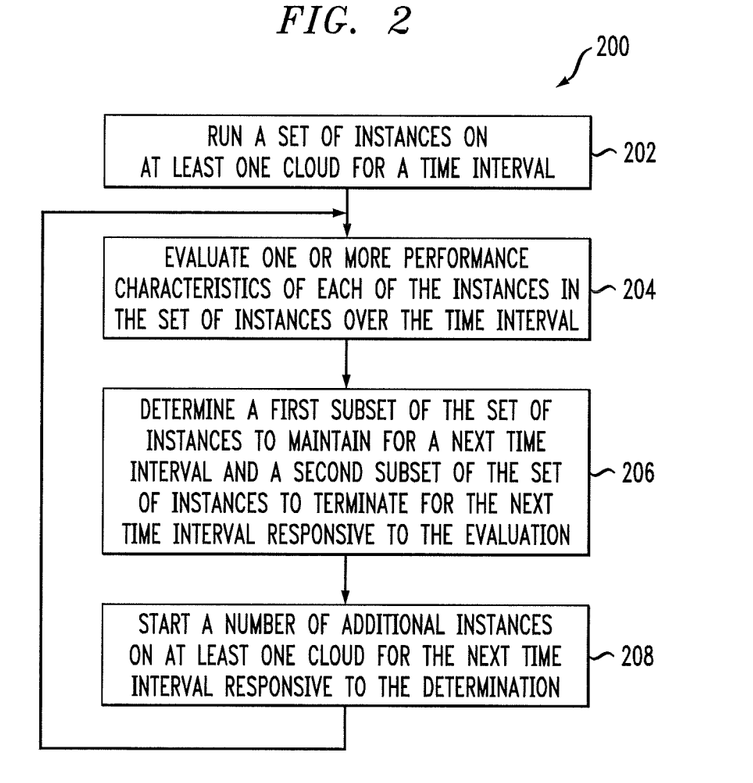
FIG. 2 illustrates a methodology for determining sets of instances to run on a cloud, according to an embodiment of the invention.

FIG. 2 illustrates a methodology 200 which may be performed in embodiments of the invention. In step 202, a set of instances is run on at least one cloud for a time interval. Next, in step 204, one or more performance characteristics of each of the instances in the set of instances is evaluated over the time interval. Responsive to the evaluation in step 204, step 206 determines a first subset of the set of instances to maintain for a next time interval and a second subset of the set of instances to terminate for the next time interval. In some embodiments, the methodology further performs step 208, where a number of additional instances are started on at least one cloud for the next time interval responsive to the determination in step 206. In some embodiments, steps 204, 206 and 208 may be repeated for one or more subsequent time intervals.

A controller or processing device may be used to perform the various steps of methodology 200 shown in FIG. 2. The controller or processing device may implement one or more of the instances module 142, evaluation module 144 and subset determination module 146 as shown in FIG. 1. The instances module 142 may perform steps 202 and 208, while the evaluation module 144 performs step 204 and the subset determination module 146 performs step 206 as shown in FIG. 2. It is important to note, however, that various other arrangements are possible. For example, steps 202 and 208 may be performed in separate modules. Similarly steps 206 and 208 may be performed in the same module in other embodiments. In addition, the methodology 200 may incorporate various other steps and features described above but not explicitly shown in FIG. 2.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing user control over processing job execution in system 100. For example, the ordering of the process steps may be varied in other embodiments, or certain steps may be performed concurrently with one another rather than serially. Also, as indicated above, one or more of the process steps may be repeated periodically for a given user, or performed in parallel for the given user or multiple users.

It is to be appreciated that functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

Figure 3:
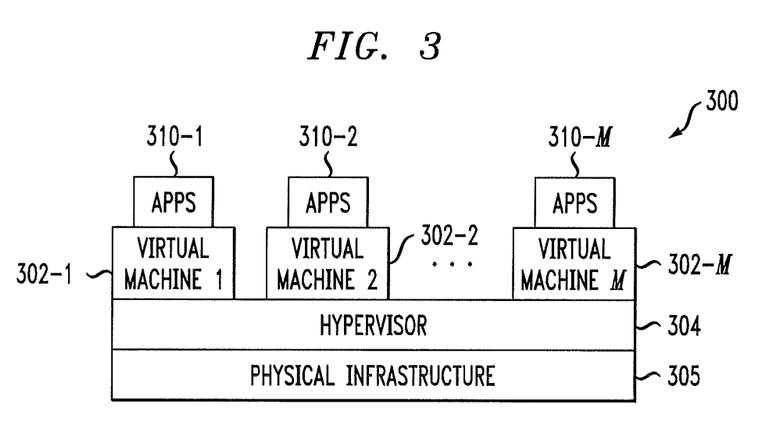
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises VMs 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the cloud infrastructure comprising at least a portion of the cloud 102. Thus, the cloud 102 may be viewed as comprising one or more of the virtual machines 302. Each of the servers 120 of cloud 102 may similarly be viewed as comprising one or more of the virtual machines 302.

Although only a single hypervisor 304 is shown in the embodiment of FIG. 3, the system 100 may of course include multiple hypervisors each providing a set of virtual machines using at least one underlying physical machine such as a given server 120 of cloud 102.

An example of a commercially available hypervisor platform that may be used to implement hypervisor 304 and possibly other portions of the cloud infrastructure of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

Figure 4:
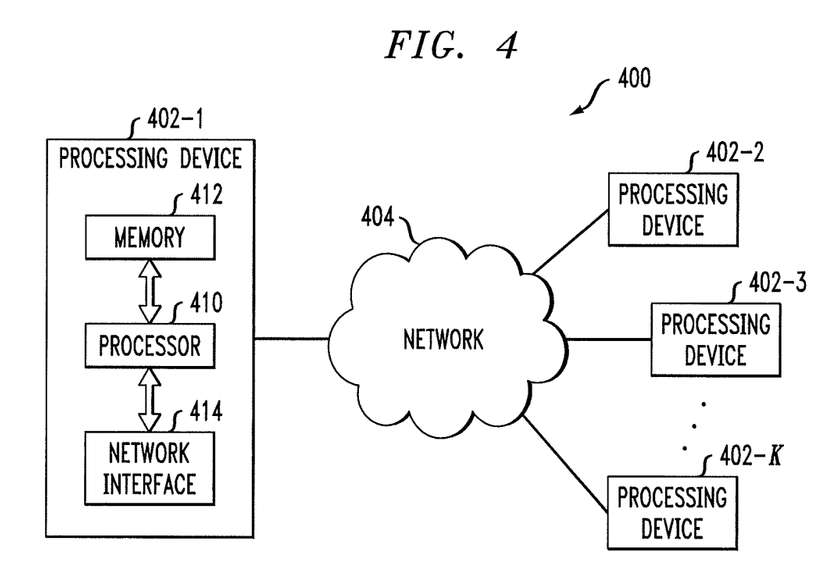

The processing platform 400 in this embodiment comprises a portion of the system 100 and includes a plurality of processing devices, denoted 402-1, 402-2, 402-3, . . . 402-K, which communicate with one another over a network 404.

The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Multiple elements of information processing system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the disclosed techniques are applicable to a wide variety of other types of devices and systems that can benefit from intelligent selection of one or more VMs or other instances to run on one or more clouds. Also, the particular configuration of system and device elements shown in FIGS. 1, 3 and 4, and the methodology shown in FIG. 2, can be varied in other embodiments. Moreover, the particular cloud metrics or other parameters that are collected from a cloud or clouds, the particular information that is compiled from such parameters, and the manner in which selection among candidate VMs or other instances, clouds, etc. is performed using such information, may be altered in other embodiments in order to suit the needs of a particular implementation. These and numerous other alternative embodiments within the scope of the appended claims will be readily apparent to those skilled in the art.

What is claimed is:

1. A method comprising the steps of:
running a set of instances on at least one cloud for a first time interval for a given processing job, each of the instances in the set of instances comprising a bundle of virtualized resources;
evaluating one or more performance characteristics of each of the instances in the set of instances over the first time interval;
separating the set of instances into a first subset of the set of instances to maintain for a second time interval and a second subset of the set of instances to terminate for the second time interval responsive to the evaluating step;
starting at least one additional instance on the at least one cloud for the second time interval to replace at least one of the instances in the second subset; and migrating at least one of the instances in the second subset to the at least one additional instance;
wherein evaluating the one or more performance characteristics comprises determining an average performance level of the set of instances over the first time interval;
wherein separating the set of instances into the first subset and the second subset comprises:
   determining a migration cost for migrating a given instance in the set of instances, the migration cost being amortized across an expected amount of time remaining for completion of the given processing job; and
   placing the given instance in the second subset based at least in part on determining that a performance level of the given instance, taking into account the migration cost, is below the average performance level of the set of instances over the first time interval; and
wherein the steps are performed by at least one processing device comprising a processor coupled to a memory.

2. The method of claim 1, wherein each of the instances in the set of instances comprises at least one virtual machine.

3. The method of claim 1, wherein at least one of the instances in the set of instances is run on a first cloud and at least another one of the instances in the set of instances is run on a second cloud.

4. The method of claim 1, wherein two or more of the instances in the set of instances are run on a single cloud.

5. The method of claim 1, wherein the one or more performance characteristics of each of the instances in the set of instances comprises at least one performance characteristic for respective ones of the virtualized resources in the bundle of virtualized resources in each of the instances in the set of instances, wherein the virtualized resources comprise one or more of:
   a central processing unit resource;
   a memory resource;
   a network resource;
   a disk resource; and
   an application resource.

6. The method of claim 1, wherein the separating step is further responsive to an evaluation of one or more cloud characteristics of the at least one cloud.

7. The method of claim 6, wherein the one or more cloud characteristics of the at least one cloud comprise one or more of:
   an infrastructure of a provider of the at least one cloud;
   hardware architectures of the at least one cloud; and
   a network topology of the at least one cloud.

8. The method of claim 1, wherein the separating step is further responsive to an evaluation of a historical performance of one or more instances in the set of instances on the at least one cloud.

9. The method of claim 1, wherein the first and second subsets of the set of instances are separated so as to minimize a cost for completing the given processing job.

10. The method of claim 1, wherein the first and second subsets of the set of instances are separated so as to minimize a time required to complete the given processing job.

11. The method of claim 1, wherein the evaluating step further comprises determining a performance level for each of the instances in the set of instances, and wherein the first subset of instances comprise the instances in the set of instances with the highest performance level and the second subset of instances comprises the instances in the set of instances with the lowest performance level.

12. The method of claim 1, wherein a number of additional instances started on the at least one cloud for the second time interval is less than a total number of instances in the second subset.

13. The method of claim 12, wherein the number of additional instances is selected so as to maintain a specific number of instances for the second time interval.

14. The method of claim 1, further comprising the step of repeating the evaluating, separating and starting steps for one or more additional time intervals.

15. The method of claim 1, wherein the average performance level of the set of instances comprises an exponentially weighted moving average.

16. The method of claim 12, wherein the number of additional instances is determined based at least in part on the expected amount of time remaining for completion the given processing job.

17. The method of claim 1, wherein the at least one cloud comprises a plurality of servers, and wherein the running and starting steps utilize an application programming interface of the at least one cloud, the application programming interface not permitting control of assignment of instances to particular ones of the servers of the at least one cloud.

18. The method of claim 1, wherein a number of instances in the first subset and a number of instances in the second subset are determined based at least in part on a limit of parallelization of the given processing job.

19. A computer program product comprising a non-transitory processor-readable storage medium having encoded therein executable code of one or more software programs, wherein the one or more software programs when executed cause at least one processing device to perform the steps of:
   running a set of instances on at least one cloud for a first time interval for a given processing job, each of the instances in the set of instances comprising a bundle of virtualized resources;
   evaluating one or more performance characteristics of each of the instances in the set of instances over the first time interval;
   separating the set of instances into a first subset of the set of instances to maintain for a second time interval and a second subset of the set of instances to terminate for the second time interval responsive to the evaluating step;
   starting at least one additional instance on the at least one cloud for the second time interval to replace at least one of the instances in the second subset; and
   migrating at least one of the instances in the second subset to the at least one additional instance;
   wherein evaluating the one or more performance characteristics comprises determining an average performance level of the set of instances over the first time interval; and
   wherein separating the set of instances into the first subset and the second subset comprises:
      determining a migration cost for migrating a given instance in the set of instances, the migration cost being amortized across an expected amount of time remaining for completion of the given processing job; and
      placing the given instance in the second subset based at least in part on determining that a performance level of the given instance, taking into account the migration cost, is below the average performance level of the set of instances over the first time interval.

20. An apparatus comprising:
at least one processing device comprising a processor coupled to a memory, the at least one processing device being configured to:
run a set of instances on at least one cloud for a first time interval for a given processing job, each of the instances in the set of instances comprising a bundle of virtualized resources;
evaluate one or more performance characteristics of each of the instances in the set of instances over the first time interval;
separate the set of instances into a first subset of the set of instances to maintain for a second time interval and a second subset of the set of instances to terminate for the second time interval responsive to the evaluation;
start at least one additional instance on the at least one cloud for the second time interval to replace at least one of the instances in the second subset; and
migrate at least one of the instances in the second subset to the at least one additional instance;
wherein the at least one processing device is configured to evaluate the one or more performance characteristics by determining an average performance level of the set of instances over the first time interval; and
wherein the at least one processing device is configured to separate the set of instances into the first subset and the second subset by:
determining a migration cost for migrating a given instance in the set of instances, the migration cost being amortized across an expected amount of time remaining for completion of the given processing job; and
placing the given instance in the second subset based at least in part on determining that a performance level of the given instance, taking into account the migration cost, is below the average performance level of the set of instances over the first time interval.

21. The apparatus of claim 20, wherein the processing device comprises a mobile telephone.

22. The apparatus of claim 20, wherein the processing device comprises a computer.

23. A user device, comprising:
an instances module configured to run a set of instances on at least one cloud for a first time interval for a given processing job, each of the instances in the set of instances comprising a bundle of virtualized resources;
an evaluation module configured to evaluate one or more performance characteristics of each of the instances in the set of instances over the first time interval; and
a subset determination module configured to separate the set of instances into a first subset of the set of instances to maintain for a second time interval and a second subset of the set of instances to terminate for the second time interval responsive to the evaluation;
wherein the instances module is further configured to start at least one additional instance on the at least one cloud for the second time interval to replace at least one of the instances in the second subset and to migrate at least one of the instances in the second subset to the at least one additional instance;
wherein the evaluation module is configured to evaluate the one or more performance characteristics by determining an average performance level of the set of instances over the first time interval; and
wherein the subset determination module is configured to separate the set of instances into the first subset and the second subset by:
determining a migration cost for migrating a given instance in the set of instances, the migration cost being amortized across an expected amount of time remaining for completion of the given processing job; and
placing the given instance in the second subset based at least in part on determining that a performance level of the given instance, taking into account the migration cost, is below the average performance level of the set of instances over the first time interval; and
wherein the instances module, evaluation module and subset determination module are implemented by at least one processing device comprising a processor coupled to a memory.

* * * * *